US008695166B2

(12) United States Patent
Wang et al.

(10) Patent No.: US 8,695,166 B2
(45) Date of Patent: Apr. 15, 2014

(54) HINGE FOR A PORTABLE COMPUTING DEVICE

(75) Inventors: Ting-Hsien Wang, New Taipei (TW); Zheng-Cheng Lin, New Taipei (TW)

(73) Assignee: Shin Zu Shing Co., Ltd, New Taipei (TW)

( * ) Notice: Subject to any disclaimer, the term of this patent is extended or adjusted under 35 U.S.C. 154(b) by 0 days.

(21) Appl. No.: 13/563,793

(22) Filed: Aug. 1, 2012

(65) Prior Publication Data

US 2014/0033477 A1 Feb. 6, 2014

(51) Int. Cl.
*E05D 11/06* (2006.01)
*E05D 5/10* (2006.01)

(52) U.S. Cl.
USPC ............ 16/374; 16/386; 16/376; 16/377; 16/342; 16/337

(58) Field of Classification Search
USPC ........... 16/386, 342, 337, 338, 371, 372, 378; 361/679.06, 679.08, 679.11, 679.12, 361/679.15, 679.27, 679.28; 455/575.1, 455/575.3, 575.4, 575.8, 550.1, 90.3; 348/373, 333.06, 794; 379/433.12, 379/433.13
See application file for complete search history.

(56) References Cited

U.S. PATENT DOCUMENTS

| | | | | |
|---|---|---|---|---|
| 5,131,779 A * | 7/1992 | Sen | ................................. | 403/91 |
| 5,970,580 A * | 10/1999 | Katoh | ............................. | 16/337 |
| 6,826,802 B2 * | 12/2004 | Chang | ............................ | 16/375 |
| 7,137,173 B2 * | 11/2006 | Sipple | ............................. | 16/223 |
| 2007/0000088 A1 * | 1/2007 | Mao et al. | ......................... | 16/54 |
| 2007/0033771 A1 * | 2/2007 | Hung | .............................. | 16/367 |
| 2008/0229544 A1 * | 9/2008 | Hsu et al. | ........................ | 16/223 |
| 2008/0239635 A1 * | 10/2008 | Chen | ............................. | 361/681 |
| 2011/0146028 A1 * | 6/2011 | Lee | ................................ | 16/319 |

* cited by examiner

*Primary Examiner* — Chuck Mah
(74) *Attorney, Agent, or Firm* — Alan Kamrath; Kamrath IP Lawfirm, P.A.

(57) ABSTRACT

A hinge for a portable computing device has a shaft, a rotating bracket and a stationary bracket. The shaft includes a first portion and a second portion. The first portion is a cylindrical tube. The cylindrical tube has an internal cavity. The second portion has an outer surface and a notch. The notch is formed in the outer surface of the second portion and communicates with the internal cavity of the cylindrical tube. Therefore, cables extending through the internal cavity of the cylindrical tube of the shaft will extend through the notch to electrically connect their corresponding devices in a base and a cover of the portable computing device. The connection of the cables to their corresponding devices is facilitated, because there is no obstruction in the notch, thereby increasing productivity.

14 Claims, 4 Drawing Sheets

HINGE FOR A PORTABLE COMPUTING DEVICE

BACKGROUND OF THE INVENTION

1. Field of the Invention

The present invention relates to a hinge, and more particularly to a hinge for a portable computing device that facilitates the connection of cables to their corresponding devices.

2. Description of the Related Art

A portable computing device having movable parts generally requires a hinge that assists the movement of a cover relative to a base. With reference to FIG. 4, a conventional hinge disclosed in US Patent Application Publication No. 2011/0242756 comprises a shaft 40 and a rotating bracket 50 rotatably mounted on the shaft 40. The shaft 40 is formed by processing a rod-like material and includes a first portion and a second portion. The first portion is cut to form a cylindrical tube 41 by a computer numerical control (CNC) machine. The cylindrical tube 41 has an internal cavity, an inward opening 411 and an outward opening (not shown). The second portion is cut and drilled to form a fastening piece 42 by a numerical control (NC) machine.

To attach the hinge to a base and a cover of a portable computing device, screws are adapted to secure the fastening piece 42 of the shaft 40 to the base and also to secure the rotating bracket 50 to the cover. Cables, which serve to provide power and communications between devices in the base and cover, are then passed through the internal cavity of the cylindrical tube 41 of the shaft 40 from the outward opening and extend out of the inward opening 411 to electrically connect the corresponding devices in the base and cover.

However, the cables extending from the inward opening 411 are blocked by the screws on the fastening piece 42, so that the cables cannot be connected directly to their corresponding devices. Thus, productivity is lowered. In addition, the shaft 40 is produced by the NC and CNC machines, both of which are expensive to purchase, and this results in a high cost of the hinge.

To overcome the shortcomings, the present invention provides a hinge for a portable computing device to mitigate or obviate the aforementioned problems.

SUMMARY OF THE INVENTION

The main objective of the present invention is to provide a hinge for a portable computing device that facilitates the connection of cables to their corresponding devices.

To achieve the foregoing objective, the hinge for a portable computing device in accordance with the present invention comprises a shaft, a rotating bracket and a stationary bracket. The shaft includes a first portion and a second portion. The first portion is a cylindrical tube. The cylindrical tube has an internal cavity. The second portion has an outer surface and a notch. The notch is formed in the outer surface of the second portion and communicates with the internal cavity of the cylindrical tube. The rotating bracket is rotatably mounted around the cylindrical tube of the shaft. The stationary bracket is secured to the second portion of the shaft. Therefore, cables extending through the internal cavity of the cylindrical tube of the shaft will extend through the notch to electrically connect their corresponding devices in a base and a cover of the portable computing device. The connection of the cables to their corresponding devices is facilitated because there is no obstruction in the notch, thereby increasing productivity.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
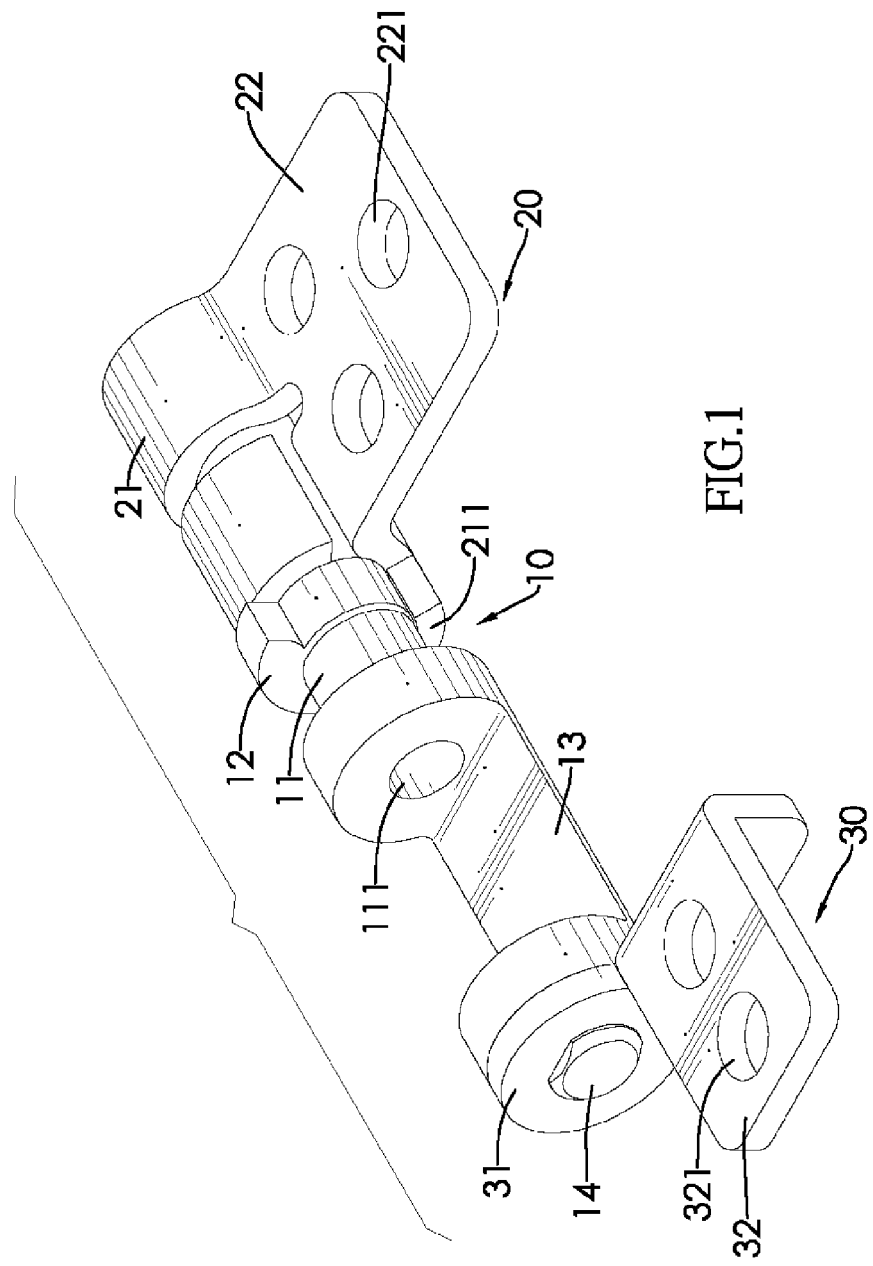
FIG. 1 is a top perspective view of a hinge in accordance with the present invention.
Figure 2:
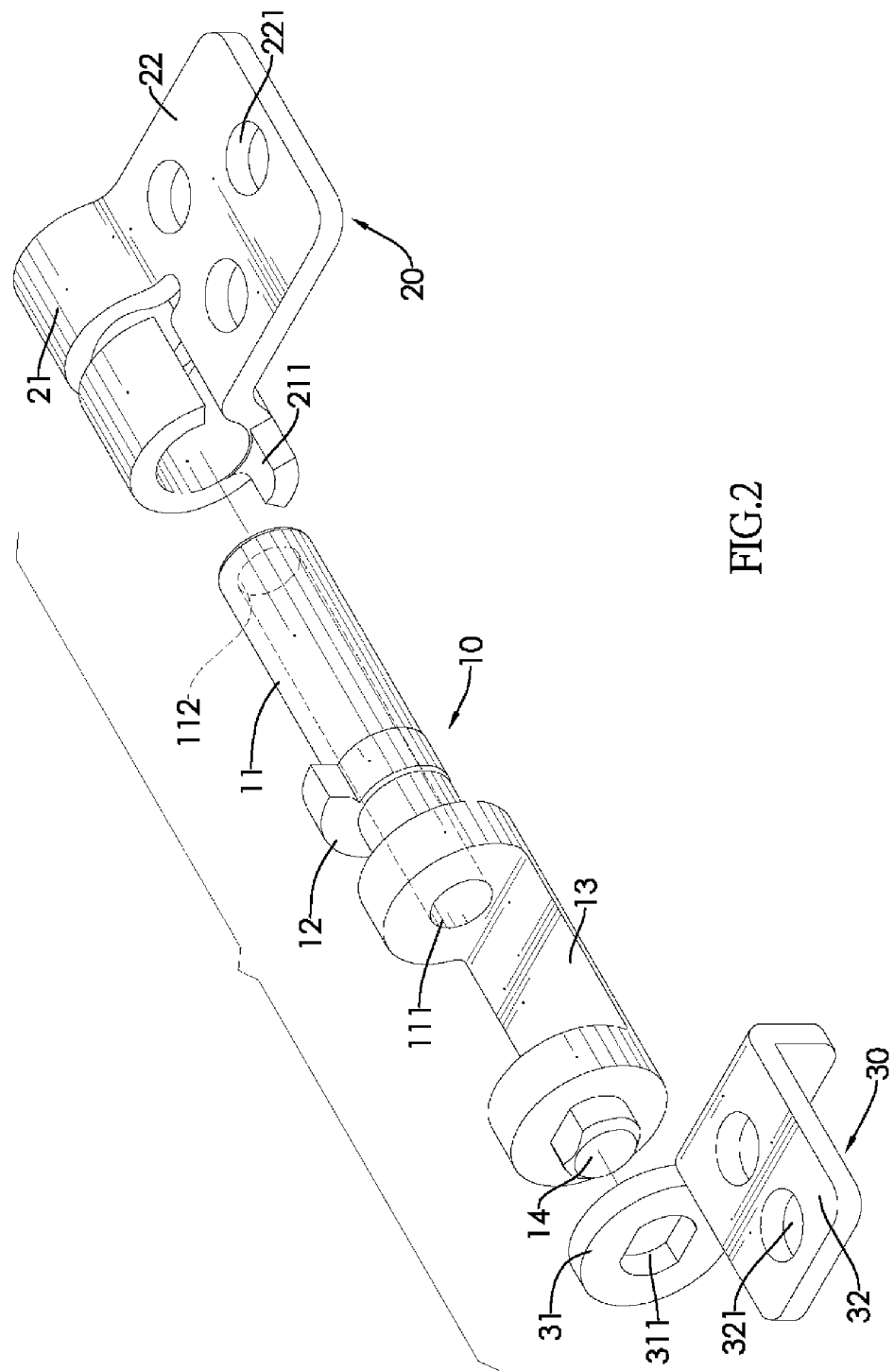
FIG. 2 is an exploded perspective view of the hinge in FIG. 1.

With reference to FIGS. 1 and 2, a hinge for a portable computing device in accordance with the present invention comprises a shaft 10, a rotating bracket 20 and a stationary bracket 30.

The shaft 10 is formed by processing a rod-like material and includes a first portion and a second portion. The first portion is cut to form a cylindrical tube 11 by a CNC machine. The cylinder tube 11 has an internal cavity, an inward opening 111 and an outward opening 112. An integrated stop 12 is formed on an outer surface of the cylindrical tube 11. The second portion has an outer surface, an outward end and a notch 13. The notch 13 is formed in the outer surface of the second portion by a cutting machine and communicates with the internal cavity of the cylindrical tube 11 via the inward opening 111. A projection 14 extends from the outward end of the second portion and has a non-circular cross-section.

Figure 3:
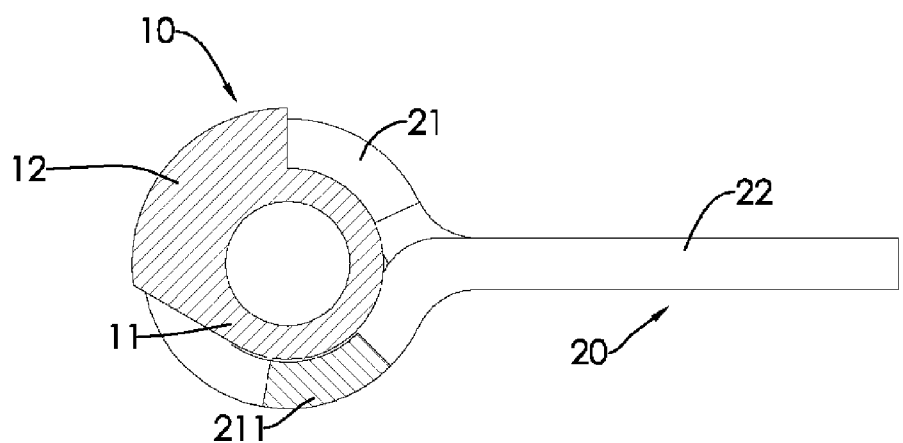
FIG. 3 is a cross-sectional side view of the hinge in FIG. 1.
Figure 4:
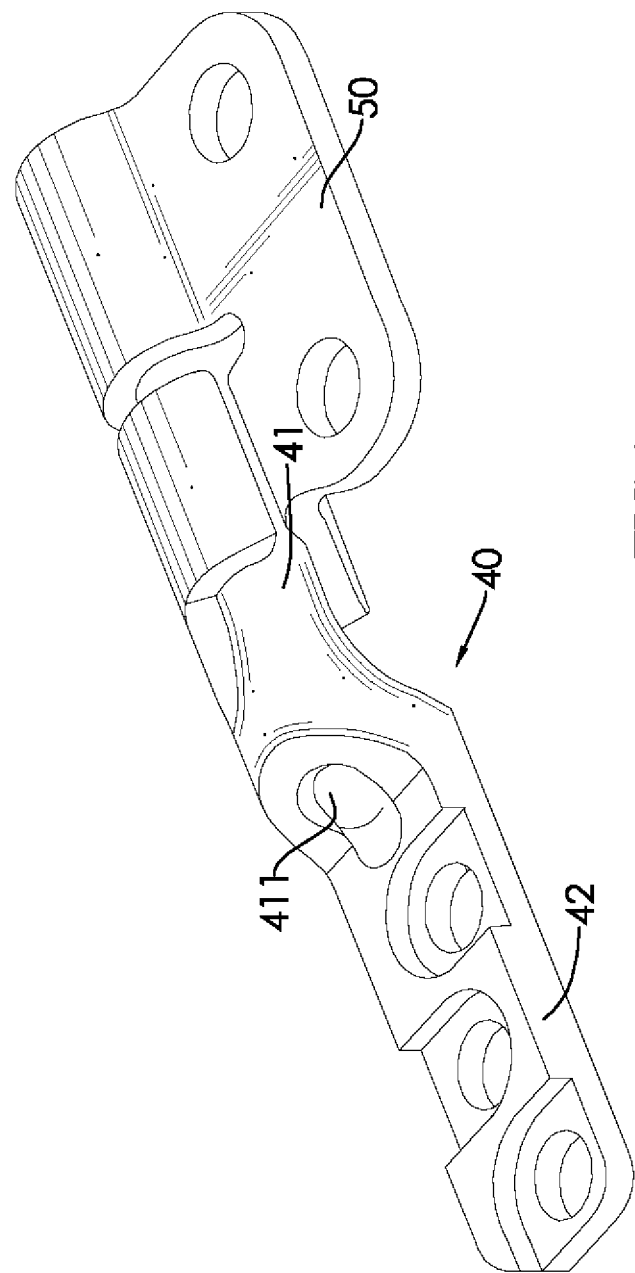
FIG. 4 is a top perspective view of a conventional hinge in accordance with the prior art.

Both of the rotating bracket 20 and the stationary bracket 30 are formed by stamping sheet metal. With further reference to FIG. 3, the rotating bracket 20 is rotatably mounted on the cylindrical tube 11 of the shaft 10 and includes a sleeve 21 and a mount 22. The sleeve 21 is rotatably mounted around the cylindrical tube 11 of the shaft 10. An integrated step 211 on the sleeve 21 is strategically formed and positioned to interact with the integrated stop 12 on the cylindrical tube 11 of the shaft 10, such that relative rotation between the rotating bracket 20 and the shaft 10 is stopped at a particular angle or location. The mount 22 extends from the sleeve 21 and has a plurality of holes 221.

The stationary bracket 30 is secured to the second portion of the shaft 10 and includes a connecting piece 31 and a mount 32. The connecting piece 31 has a non-circular hole 311 for matingly receiving the non-circular projection 14 of the shaft 10. Preferably, a free end of the projection 14 is flattened and deformed to rivet the stationary bracket 30 to the shaft 10. The mount 32 extends from the connecting piece 31 and has a plurality of holes 321.

To attach the hinge to a base and a cover of the portable computing device, screws are adapted to extend through the holes 321 in the stationary bracket 30 and screw into the base, and also to extend through the holes 221 in the rotating bracket 20 and screw into the cover to respectively secure the stationary bracket 30 and rotating bracket 20 to the base and the cover. Cables, which serve to provide power and communications between devices in the base and cover, are then extended through the internal cavity of the cylindrical tube 11 of the shaft 10 from the outward opening 112 and extend out of the inward opening 111 to enter the notch 13 and to electrically connect their corresponding devices in the base and the cover.

The hinge of the present invention facilitates the connection of the cables to their corresponding devices, because there is no obstruction in the notch 13, thereby increasing productivity. In addition, the notch 13 is formed by the low-cost cutting machine rather than the expensive NC machine, and the rotating bracket 20 and stationary bracket 30 are usual components and are also low-cost. Therefore, the cost of producing the hinge can be reduced.

Even though numerous characteristics and advantages of the present invention have been set forth in the foregoing description, together with details of the structure and features of the invention, the disclosure is illustrative only. Changes may be made in the details, especially in matters of shape, size and arrangement of parts within the principles of the invention to the full extent indicated by the broad general meaning of the terms in which the appended claims are expressed.

What is claimed is:

1. A hinge comprising:
    a shaft including:
        a first portion being a cylindrical tube having an internal cavity; and
        a second portion having:
            an outer surface; and
            a notch formed in the outer surface of the second portion and communicating with the internal cavity of the cylindrical tube;
    a rotating bracket rotatably mounted on the cylindrical tube of the shaft; and
    a stationary bracket secured to the second portion of the shaft, wherein:
    a projection extends from an outward end of the second portion of the shaft and has a non-circular cross-section; and
    the stationary bracket includes
        a connecting piece having a non-circular hole for matingly receiving the non-circular projection of the shaft; and
        a mount extending from the connecting piece.

2. The hinge as claimed in claim 1, wherein:
    the first portion of the shaft is cut to form the cylindrical tube by a CNC machine; and
    the notch of the second portion of the shaft is formed by a cutting machine.

3. The hinge as claimed in claim 2, wherein a free end of the projection is flattened and deformed to rivet the stationary bracket to the shaft.

4. The hinge as claimed in claim 3, wherein:
    an integrated stop is formed on an outer surface of the cylindrical tube of the shaft; and
    the rotating bracket includes
        a sleeve rotatably mounted around the cylindrical tube of the shaft, with an integrated step on the sleeve strategically formed and positioned to interact with the integrated stop on the cylindrical tube of the shaft; and
        a mount extending from the sleeve.

5. The hinge as claimed in claim 4, wherein:
    the shaft is formed by processing a rod-like material; and
    both of the rotating bracket and the stationary bracket are formed by stamping sheet metal.

6. The hinge as claimed in claim 2, wherein:
    an integrated stop is formed on an outer surface of the cylindrical tube of the shaft; and
    the rotating bracket includes
        a sleeve rotatably mounted around the cylindrical tube of the shaft, with an integrated step on the sleeve strategically formed and positioned to interact with the integrated stop on the cylindrical tube of the shaft; and
        a mount extending from the sleeve.

7. The hinge as claimed in claim 6, wherein:
    the shaft is formed by processing a rod-like material; and
    both of the rotating bracket and the stationary bracket are formed by stamping sheet metal.

8. The hinge as claimed in claim 2, wherein:
    the shaft is formed by processing a rod-like material; and
    both of the rotating bracket and the stationary bracket are formed by stamping sheet metal.

9. The hinge as claimed in claim 1, wherein a free end of the projection is flattened and deformed to rivet the stationary bracket to the shaft.

10. The hinge as claimed in claim 9, wherein:
    an integrated stop is formed on an outer surface of the cylindrical tube of the shaft; and
    the rotating bracket includes
        a sleeve rotatably mounted around the cylindrical tube of the shaft, with an integrated step on the sleeve strategically formed and positioned to interact with the integrated stop on the cylindrical tube of the shaft; and
        a mount extending from the sleeve.

11. The hinge as claimed in claim 10, wherein:
    the shaft is formed by processing a rod-like material; and
    both of the rotating bracket and the stationary bracket are formed by stamping sheet metal.

12. The hinge as claimed in claim 1, wherein:
    an integrated stop is formed on an outer surface of the cylindrical tube of the shaft; and
    the rotating bracket includes
        a sleeve rotatably mounted around the cylindrical tube of the shaft, with an integrated step on the sleeve strategically formed and positioned to interact with the integrated stop on the cylindrical tube of the shaft; and
        a mount extending from the sleeve.

13. The hinge as claimed in claim 12, wherein:
    the shaft is formed by processing a rod-like material; and
    both of the rotating bracket and the stationary bracket are formed by stamping sheet metal.

14. The hinge as claimed in claim 1, wherein:
    the shaft is formed by processing a rod-like material; and
    both of the rotating bracket and the stationary bracket are formed by stamping sheet metal.

* * * * *